(12) United States Patent  
Kobayashi

(10) Patent No.: US 10,112,488 B2  
(45) Date of Patent: Oct. 30, 2018

(54) ELECTRICALLY POWERED VEHICLE

(71) Applicant: HONDA MOTOR CO., LTD., Tokyo (JP)

(72) Inventor: Shinya Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 29 days.

(21) Appl. No.: 15/229,451

(22) Filed: Aug. 5, 2016

(65) Prior Publication Data

US 2017/0036548 A1    Feb. 9, 2017

(30) Foreign Application Priority Data

Aug. 5, 2015   (JP) ................................ 2015-155293

(51) Int. Cl.
  *B60L 7/18*    (2006.01)

(52) U.S. Cl.
  CPC ............ *B60L 7/18* (2013.01); *B60Y 2200/91* (2013.01); *B60Y 2300/18125* (2013.01); *B60Y 2300/89* (2013.01); *B60Y 2300/91* (2013.01); *B60Y 2400/81* (2013.01); *Y02T 10/7005* (2013.01)

(58) Field of Classification Search
  CPC .............. B60L 2240/421; B60L 11/123; B60L 15/2009; B60L 7/10; B60L 7/18; B60L 11/14; B60L 7/14; B60L 11/1803; B60L 2240/14; B60L 7/24; B60T 8/17616; B60T 13/686; B60T 2220/04; B60T 7/122
  USPC ............... 701/1, 71, 70, 22, 36, 51
  See application file for complete search history.

(56) References Cited

U.S. PATENT DOCUMENTS

| 6,142,586 | A  | * | 11/2000 | Sakai    | ........................ | B60L 7/26 303/152 |
| 2004/0122579 | A1 | * | 6/2004 | Ashizawa | .................. | B60L 7/26 701/70 |
| 2006/0131956 | A1 | * | 6/2006 | Matsuura | ............... | B60K 6/445 303/152 |
| 2006/0220453 | A1 | * | 10/2006 | Saito    | ........................ | B60L 7/26 303/152 |

(Continued)

FOREIGN PATENT DOCUMENTS

JP    10-271605 A    10/1998

OTHER PUBLICATIONS

Office Action dated Sep. 26, 2017, issued in counterpart Japanese Application No. 2015-155293, with English translation (4 pages).

*Primary Examiner* — Yazan A Soofi  
*Assistant Examiner* — Luis A Martinez Borrero  
(74) *Attorney, Agent, or Firm* — Westerman, Hattori, Daniels & Adrian, LLP

(57) ABSTRACT

A MG-ECU includes, as a regeneration limiting value, a limited value set according to a state of a battery, and an unlimited value enabling generation of braking force greater than the limited value. In a state in which regenerative braking is being limited, the MG-ECU causes frictional braking force to be generated based on a difference between the unlimited value and the drive force demand of a driver. In cases in which the frictional braking force is also limited in a state of the regenerative braking, the MG-ECU switches the regeneration limiting value from the limited value to the unlimited value, and requests a motor-generator to generate regenerative braking based on the limited value.

6 Claims, 8 Drawing Sheets

(56) References Cited

U.S. PATENT DOCUMENTS

| | | | | |
|---|---|---|---|---|
| 2012/0136547 A1* | 5/2012 | Miyazaki | ............... | B60T 1/10 701/70 |
| 2013/0257140 A1* | 10/2013 | Ogiwara | ............... | B60T 13/586 303/3 |
| 2016/0129791 A1* | 5/2016 | Huh | ............... | B60L 7/26 701/70 |

* cited by examiner

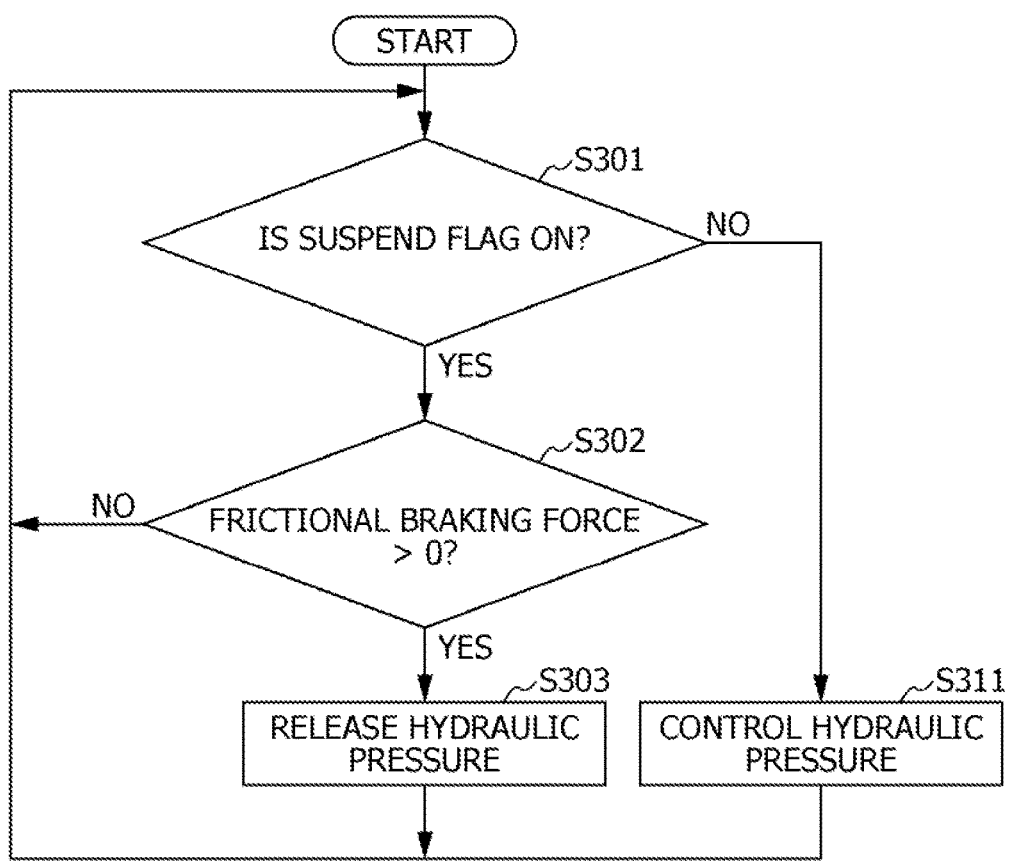

ELECTRICALLY POWERED VEHICLE

CROSS REFERENCES TO RELATED APPLICATIONS

The present application claims priority under 35 U.S.C. § 119 to Japanese Patent Application No. 2015-155293, filed Aug. 5, 2015, entitled "Electrically Powered Vehicle." The contents of this application are incorporated herein by reference in their entirety.

BACKGROUND

1. Field

The present embodiment relates to an electrically powered vehicle provided with a traction motor.

2. Description of the Related Art

Japanese Unexamined Patent Application Publication No. 10-271605 describes technology for switching from regenerative braking force to frictional braking force in an electric vehicle when a battery that stores electricity, such as regenerated electrical power, has reached full charge.

For example, in a vehicle such as an electric vehicle, switching is made from regenerative braking force to frictional braking force when a battery for storing electricity, such as regenerated electrical power, reaches full charge, such as in the technology described in Japanese Unexamined Patent Application Publication No. 10-271605.

In particular, in order to realize braking like that of engine braking in an ordinary gasoline car or diesel car, braking force equivalent to engine braking and arising from regenerative braking force can also be realized in an electric vehicle. In such cases, when the amount of charging of the battery approaches a reference value acting as the limit for charging, conceivably a unit for implementing braking force equivalent to engine braking might make a smooth transition from regenerative braking force to frictional braking force by gradually reducing the regenerative braking force, and gradually increasing the frictional braking force. Generating frictional braking force is also conceivable in cases in which, relative to the braking force demanded by a driver, there is insufficient battery charge, or insufficient braking force due to regenerative braking force being limited in order to protect the battery.

The technology of Japanese Unexamined Patent Application Publication No. 10-271605 is technology to switch from regenerative braking to frictional braking in cases in which regeneration is limited due to a battery reaching full charge, or the like. Hitherto, when regeneration is limited, deficiencies in drive force demanded by a driver (drive force demand) have been supplemented by frictional braking force; however, fractional braking force cannot foe generated in cases in which there has been a breakdown in frictional braking force, or cases in which a rise in the temperature of brake components (brake pads or rotors) has occurred.

However, there is no mention in Japanese Unexamined Patent Application Publication No. 10-271605 regarding how braking force will be generated in cases in which frictional braking force cannot be generated under regeneration limiting.

SUMMARY

The present application describes generation of braking force in cases in which frictional braking force cannot be generated under regeneration limiting.

A first aspect of technology disclosed herein is an electrically powered vehicle including a regenerative braking force generator that generates regenerative braking force in a vehicle, a battery that stores electrical power regenerated with the regenerative braking force, a frictional braking force generator that generates frictional braking force in a vehicle, and a controller that controls generation of the regenerative braking force and the frictional braking force, thereby controlling a total breaking force applied to the vehicle according to a drive force (deceleration and/or acceleration) demand from a driver. The controller includes as a limit threshold value of the regenerative braking force, a first regeneration limit threshold value set according to a state of the battery, and a second regeneration limit threshold value enabling generation of braking force greater than the first regeneration limit. The controller, in a state in which regenerative braking is being limited, causes frictional braking force to be generated based on a difference between the second regeneration limit threshold value and the drive force demand of a driver, in cases in which the frictional braking force is also limited in a state of the regenerative braking, switches the limit threshold value from the second regeneration limit threshold value to the first regeneration limit threshold value, and requests the regenerative braking force generator to generate regenerative braking based on the first regeneration limit threshold value.

The first aspect of technology disclosed herein enables braking force to be generated under regeneration limiting, even in cases in which frictional braking is limited.

A second aspect of technology disclosed herein may be the electrically powered vehicle of the first aspect, wherein the controller switches from the first regeneration limit threshold value to the second regeneration limit threshold value when the driver has actuated acceleration.

The application according to the second aspect enables surprise, arising from braking force from the frictional braking component suddenly disappearing while frictional braking is being performed, to be prevented from occurring, due to frictional braking being switched in a not-in-use state.

A third aspect of technology disclosed herein may be the electrically powered vehicle of the first aspect or the second aspect, wherein the first regeneration limit threshold value is based on regenerative braking force the regenerative braking force generator is capable of outputting when the battery is in a regenerative braking state.

The application according to the third aspect enables limited regenerative braking force to be generated, even in a state in which frictional braking is being limited.

A fourth aspect of technology disclosed herein may be the electrically powered vehicle of any one of the first aspect to the third aspect, wherein the first regeneration limit threshold value is based on regenerative braking force the regenerative braking force generator is capable of outputting when the battery is in a non-regenerative braking state.

The application according to the fourth aspect enables all the demanded braking force to be output in a state in which frictional braking is not being limited.

A fifth aspect of technology disclosed herein may be the electrically powered vehicle of any one of the first aspect to the fourth aspect, wherein the controller smoothes and outputs regenerative braking generated based on the first regeneration limit threshold value.

The application according to the fifth aspect enables the elimination of abrupt change in the braking force arising when the braking force demand is limited to the first regeneration limit threshold value. This thereby enables the elimination of a feeling of unease being imparted to the driver, and enables an improvement in feel.

A sixth aspect of technology disclosed herein may be the electrically powered vehicle of any one of the first aspect to the fifth aspect, wherein the controller gradually reduces the frictional braking force when limiting the frictional braking.

The application according to the sixth aspect enables a sharp reduction in braking force to be prevented.

The present application describes being able to generate braking force in cases in which frictional braking force cannot be generated under regeneration limiting.

BRIEF DESCRIPTION OF THE DRAWINGS

FIG. 8 is a flowchart illustrating an operational sequence in a hydraulic control section of an ESB-ECU.

DESCRIPTION OF THE PREFERRED EMBODIMENTS

Detailed explanation follows regarding a mode (an "embodiment") for implementing the present application, with reference to the drawings as appropriate.

Overall Configuration

Figure 1:
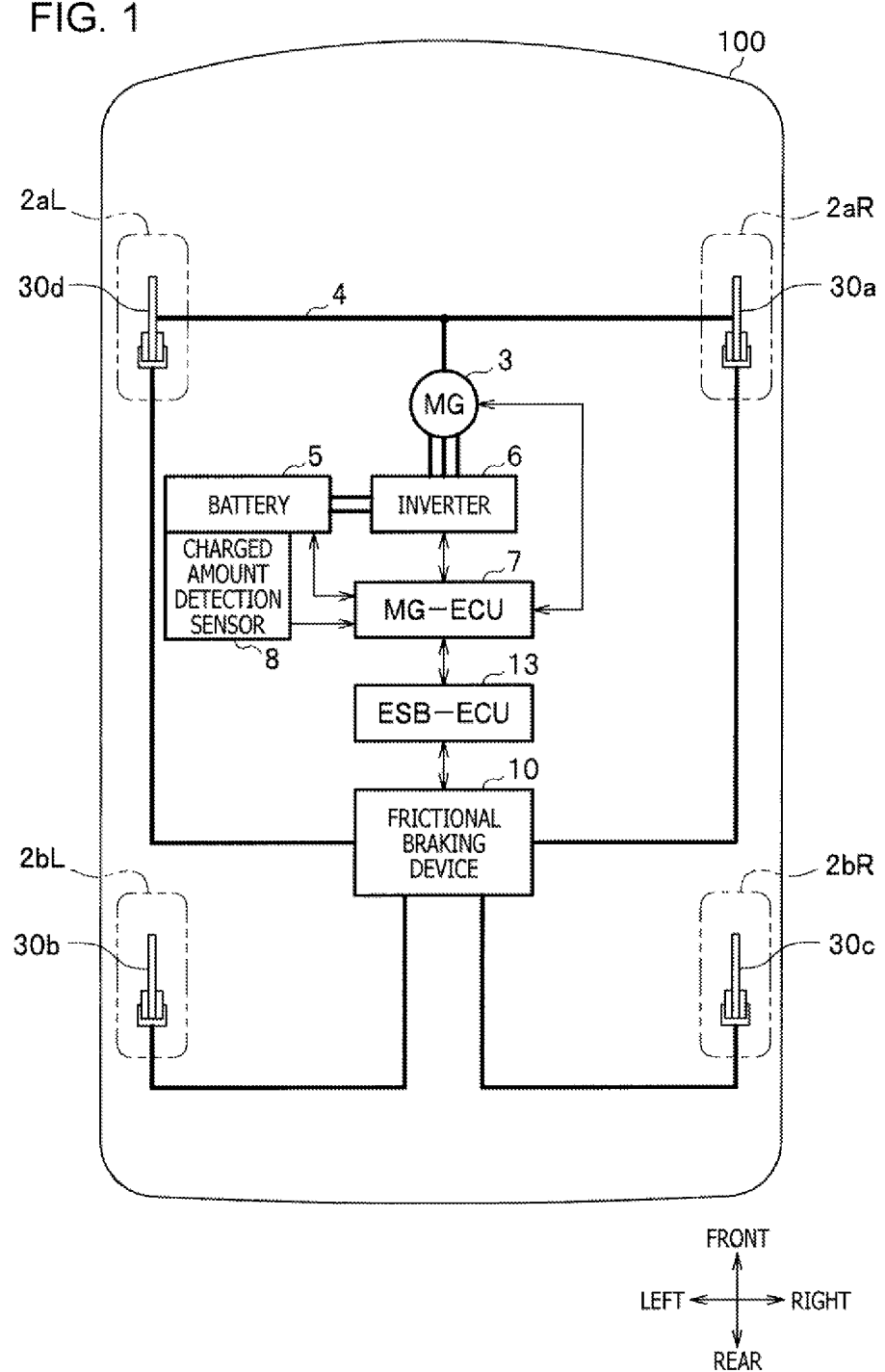
FIG. 1 is a system diagram of relevant portions of a vehicle according to a present embodiment.

FIG. 1 is a system diagram of relevant portions of a vehicle according to the present embodiment.

This vehicle 100 is, for example, an electric vehicle, and includes a left and right pair of front wheels 2aR, 2aL provided at the front side of the vehicle 100, and a left and right pair of rear wheels 2bR, 2bL provided at the rear side of the vehicle 100. A motor-generator (MG) 3 is coupled through a torque transmission mechanism to a front axle 4 coupling the left and right front wheels 2aR, 2aL together. The vehicle 100 may be configured with four wheel drive, rear wheel drive, or as a hybrid vehicle provided with the motor-generator 3. The operating mechanism provided to the front axle 4 is omitted from illustration.

The motor-generator 3 doubles as both an electric motor for driving the vehicle 100, and as an electric generator used in regeneration. A battery 5, configured by a rechargeable cell, supplies electrical power to the motor-generator 3 by using an inverter 6 as the power source for the motor-generator 3. Deceleration energy is converted by the motor-generator 3 into electrical power by the motor-generator 3 when the vehicle 100 decelerates, and the battery 5 stores this regenerated electrical power. Regenerative braking force is generated by the motor-generator 3 during regeneration. Namely, a regenerative braking force generator is implemented by the motor-generator 3, etc.

A charged amount detection sensor 8 (voltage sensor or current sensor) is provided in the battery 5 for detecting the amount of charging (state of charge (SOC)) of the battery 5. The battery 5 is controlled by a battery ECU; however, the battery ECU is omitted from illustration in the present embodiment.

A management-electronic control unit (MG-ECU 7) is provided with a microcomputer, and is a device to centrally control each section (described in detail later).

An electric servo brake-electronic control unit (ESB-ECU) 13 controls a non-illustrated electric motor in a frictional braking device 10 by sending control signals through signal lines according to the frictional braking force demand that has been output from the MG-ECU 7 (described in detail later).

The frictional braking device 10 serves as a frictional braking force generator. Namely, the frictional braking device 10 is a device that is connected to each of the wheel cylinders of disc brake mechanisms 30a to 30d of the respective wheels 2aR, 2aL, 2bR, 2bL, for hydraulically driving the wheel cylinders and for generating frictional braking force by pressing brake pads against brake rotors.

Various sorts of device may be applied as the frictional braking device 10, as long as it is a braking device for generating frictional braking force. For example, what is referred to as a by-wire braking system may be applied therefor. A by-wire braking system is a device that is provided with an electric motor and, under control of the electric motor, drives the disc brake mechanisms 30a to 30d of the respective wheels 2aR, 2aL, 2bR, 2bL by actuation of a hydraulic mechanism, and imparts frictional braking force to the respective wheels 2aR, 2aL, 2bR, 2bL.

Control System Configuration

Figure 2:
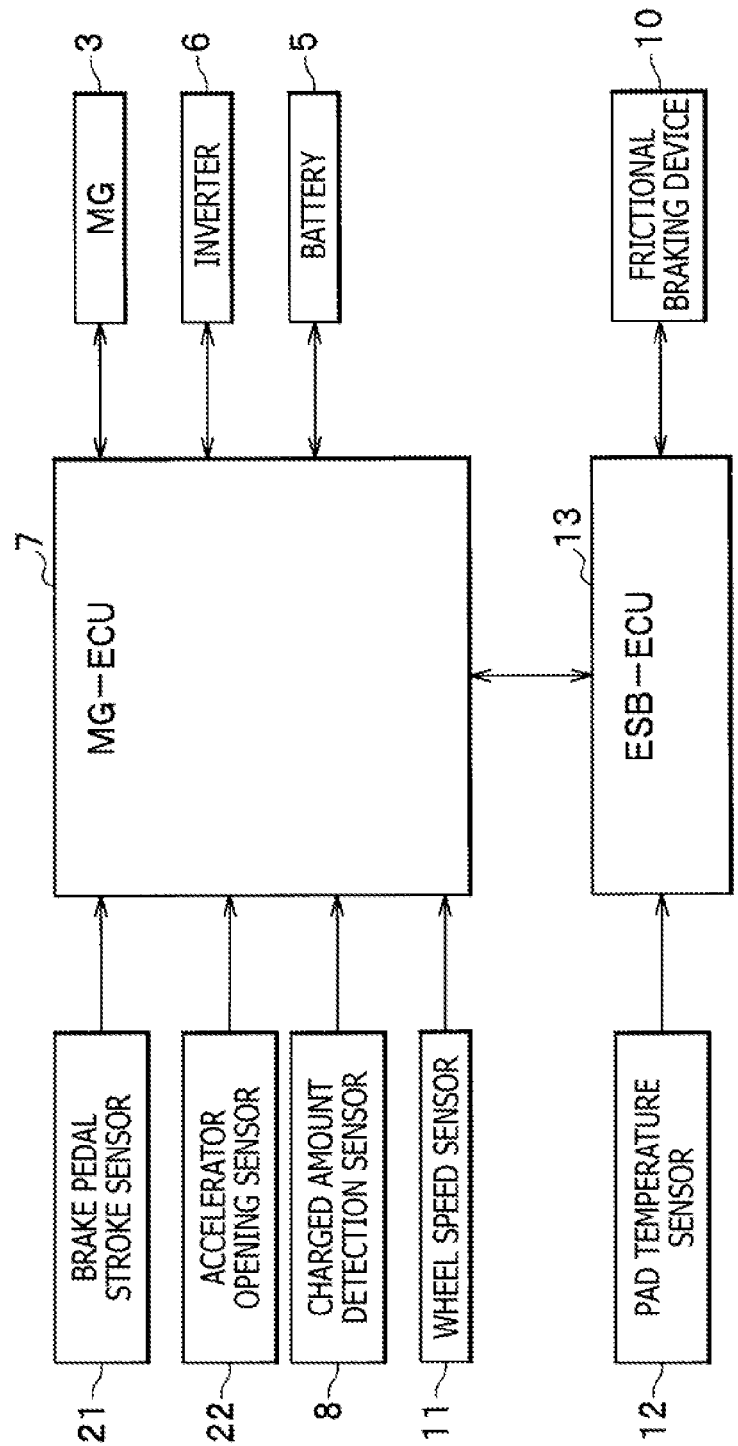
FIG. 2 is a block diagram illustrating a control system configuration of a vehicle.

FIG. 2 is a block diagram illustrating a control system configuration of a vehicle. A brake pedal stroke sensor 21 that detects the operation amount of the brake pedal, an accelerator opening sensor 22 that detects the accelerator opening, and the charged amount detection sensor 8 are connected through a specific interface to the MG-ECU 7 by signal lines. The motor-generator 3, the inverter 6, and the battery 5 are connected through a specific interface to the MG-ECU 7 by signal lines. A detection signal of a wheel speed sensor 11 (wheel speed signal) is input to the MG-ECU 7. The wheel speed sensor 11 is a sensor that detects the rotation speed of a wheel. The wheel speed signal is a pulse wave with a specific number of pulses generated for each revolution of the wheel. The MG-ECU 7 computes the vehicle speed of the vehicle 100 based on the wheel speed signal input from the wheel speed sensor 11. Thus, the wheel speed sensor 11 serves as a vehicle speed sensor to detect vehicle speed.

A pad temperature sensor 12 that measures the temperature of the brake pads provided to the respective wheels 2aR, 2aL, 2bR, 2bL is connected through a specific interface to the ESB-ECU 13 by signal lines. The MG-ECU 7 and the frictional braking device 10 are also connected to the ESB-ECU 13 by signal lines.

Detailed explanations regarding the MG-ECU 7 and the ESB-ECU 13 are given below.

Timing Chart

Figure 3A:
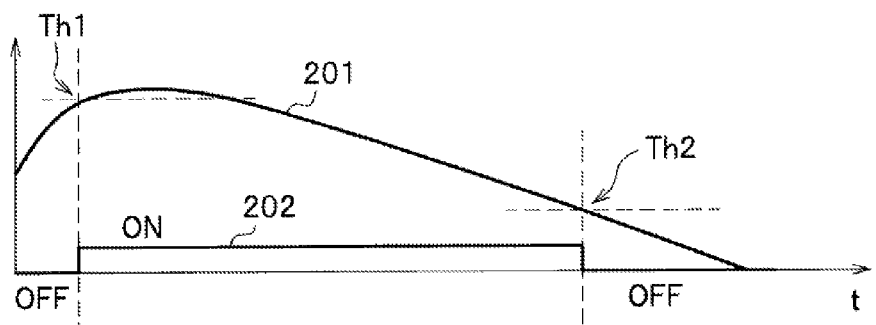
FIG. 3A to FIG. 3D are timing charts for operations in an MG-ECU and an ESB-ECU according to the present embodiment; operation in the ESB-ECU is illustrated at FIG. 3A and FIG. 3D, and operation in the MG-ECU is illustrated at FIG. 3B and FIG. 3C.
Figure 3B:
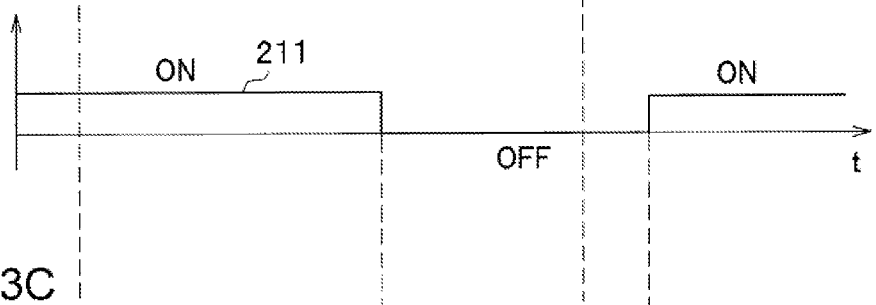
Figure 3C:
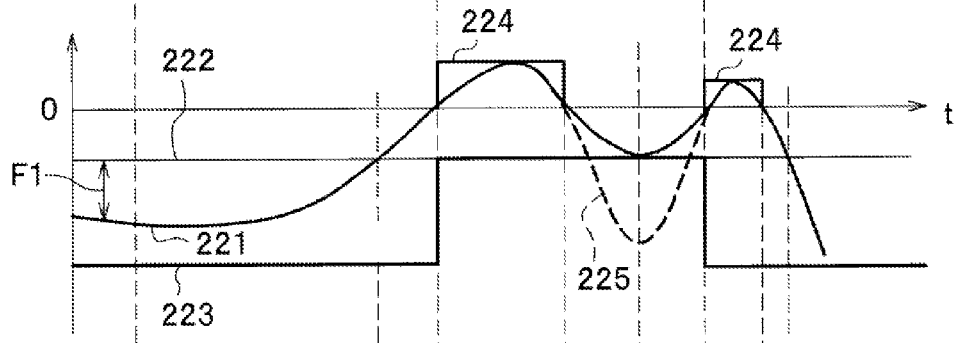
Figure 3D:
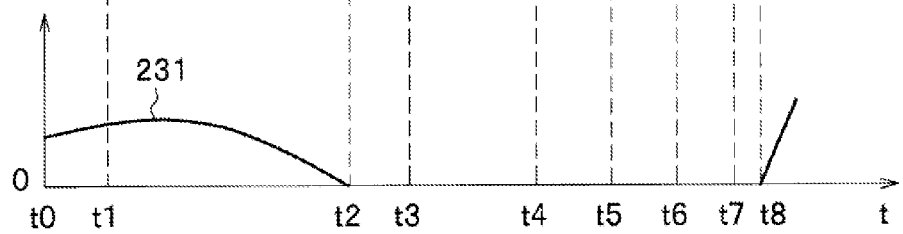

FIG. 3A to FIG. 3D are timing charts for operations in the MG-ECU and the ESB-ECU according to the present embodiment; operations in the ESB-ECU 13 are illustrated at FIG. 3A and FIG. 3D, and operations in the MG-ECU 7 are illustrated at FIG. 3B and FIG. 3C.

Reference numeral 201 in FIG. 3A indicates a change with time in temperature of a brake pad (referred to below as pad temperature). Reference numeral 202 indicates a flag to suspend frictional braking control, which is sent by the ESB-ECU 13 to the MG-ECU 7 and adopts either an ON state or an OFF state.

The reference numeral 211 in FIG. 3B indicates ON or OFF of frictional braking control in the MG-ECU 7.

The reference numeral 221 in FIG. 3C is the demanded drive force that has been subjected to smoothing processing (smoothed), reference numeral 222 indicates a limited value of a regeneration limiting value, and reference numeral 223 indicates an unlimited value of the regeneration limiting value.

In the present embodiment, drive force includes braking force. Namely, drive force that is drive force in the direction of travel (referred to as the + direction as appropriate) of the vehicle 100 is "drive force", and drive force in the opposite direction to the direction of travel (referred to as the— direction as appropriate) is "braking force". Thus, the drive force demand 221 includes braking force demand. When it is clearly braking force that is being referred to, then it is called "braking force".

The limited value (the first regeneration limit threshold value) 222 of the regeneration limiting value is a limit threshold value for the regenerative braking force. The limited value 222 is set according to the state of the battery 5, and is a limited value used when motor torque in the motor-generator 3 is limited and storage of power in the battery 5 is limited. Namely, the limited value 222 is the regenerative braking force the motor-generator 3 is capable of outputting when regeneration is being limited. Adopting such a configuration enables the regenerative braking force that is being subjected to limiting to still be generated in a state in which frictional braking is being limited.

The limited value 222 may be a value of regeneration capability even in a fully charged state, albeit though this might have a somewhat detrimental effect on the life of the battery 5.

The unlimited value (second regeneration limit threshold value) 223 of the regeneration limiting value is a limited value the battery 5 is capable of outputting according to specification, without motor torque in the motor-generator 3 being limited or storage of power in the battery 5 being limited. Namely, the unlimited value 223 is the regenerative braking force the motor-generator 3 is capable of outputting when regeneration is not being limited (during unlimited regeneration), and enables generation of braking force greater than the limited value 222. This thereby enables all the demanded braking force to be output in a state in which frictional braking is not being limited.

Reference numeral 224 indicates accelerator work. Reference numeral 225 is explained later.

The reference numeral 231 in FIG. 3D indicates the frictional braking force the frictional braking device 10 outputs.

Whether or not the battery 5 is in a regeneration limited state is determined by the SOC detected by the charged amount detection sensor 8 (see FIG. 1).

Time t0 to t1

In this interval, the driver is OFF the accelerator pedal and there is a regenerative braking state (equivalent to an engine braking state in a gasoline engine); however, since regeneration limiting is in place, any deficiency in braking force is supplemented by the frictional braking force 231.

During this interval, the regeneration limiting value is set to the unlimited value 223. Thus, since braking force up to the unlimited value 223 is demanded and regeneration limiting is in place, the MG-ECU 7 demands braking force up to the unlimited value 223 as braking force by regeneration from the motor-generator 3. The MG-ECU 7 also demands a braking force of a difference F1 between the drive force demand 221 and the unlimited value 223 as frictional braking force. The ESB-ECU 13 outputs the frictional braking force 231 demanded by the MG-ECU 7.

Time t1 to t2

At time t1, if the pad temperature 201 exceeds a first threshold value Th1 for suspending frictional braking control (limiting frictional braking), the ESB-ECU 13 raises the frictional braking control suspend flag 202 (switches the suspend flag 202 from an OFF state to an ON state).

On receipt of the suspend flag 201 in an ON state, the MG-ECU 7 demands braking force up to the unlimited value 223 as illustrated in FIG. 3C; however, as illustrated in FIG. 3D, the ESB-ECU 13 gradually releases hydraulic pressure for each of the sections in the frictional braking device 10 so as to gradually reduce the frictional braking force 231. This thereby enables a sharp reduction in braking force to be prevented.

Time t2 to t3

At time t2, the frictional braking force 231 in FIG. 3D becomes 0; however, the MG-ECU 7 leaves the frictional braking state 211 as the ON state, and leaves the regeneration limiting value at the unlimited value 223.

Time t3 to t4

At time t3, the driver depresses the accelerator pedal (actuates acceleration) and the drive force demand 224 moves to the + side (the direction of travel), the MG-ECU 7 places the frictional braking state 211 in the OFF state, and switches the regeneration limiting value to the limited value 222. Depression of the accelerator pedal is determined by the MG-ECU 7 being input with an input from the accelerator opening sensor 22 (see FIG. 1) or the like. From this point in time onwards, the braking force demandable by the MG-ECU 7 is a value up to the limited value 222. This thereby enables braking force to be generated even in cases in which frictional braking has been limited while under regeneration limiting.

Thus, the MG-ECU 7 does not immediately switch the regeneration limiting value although the frictional braking control has adopted an OFF state. The MG-ECU 7 switches the initial frictional braking state 211 to OFF and switches the regeneration limiting value only when the driver has depressed the accelerator pedal and the drive force demand 224 has moved to the + side (the direction of travel). Thus, by switching the regeneration limiting value in a state in which braking force is not being demanded (a state in which the accelerator pedal has been depressed, and the drive force demand 224 has moved to the + side (the direction of travel)), surprise, arising from braking force from the frictional braking component suddenly disappearing while frictional braking is being performed, can be prevented due to frictional braking being switched when in a not-in-use state.

Time t4 to t6

At time t4, a regenerative braking state (equivalent to engine braking in a gasoline engine) is adopted due to the driver again lifting OFF the accelerator pedal. When this occurs, the MG-ECU 7 would normally demand the braking force as indicated by the dash line 225; however, due to the regeneration limiting value being limited to the limited value 222 as described above, as illustrated in FIG. 3C, the MG-ECU 7 performs a transient processing (smoothing) on the drive force demand input by the driver to adjust the bottom part of the drive force demand which goes outside the limited threshold value 222 (the dash line 225) so as to output the adjusted drive force demand 221 (the solid line above the dash line 225) which meets the limited threshold value 222, such as by cutting the bottom of the drive force demand 225 and making the drive force to smoothly and continuously transit above the limited threshold value 222. Doing so enables the elimination of abrupt change in the braking force arising when the braking force demand is limited to the first regeneration limit threshold value. This thereby enables the elimination of a feeling of unease being imparted to the driver, and enables an improvement in feel.

Note that at time t5, as illustrated in FIG. 3A, the pad temperature 201 has fallen as far as a temperature Th2 where frictional braking control is possible, and the ESB-ECU 13 switches the suspend flag of the frictional braking control to OFF. However, the MG-ECU 7 keeps the frictional braking state ON as illustrated in FIG. 3B, and also leaves the regeneration limiting value at the limited value 222.

Time t6 to t7

At time t6, when the driver depresses the accelerator pedal and the drive force demand 224 has moved to the + side (the direction of travel), as illustrated in FIG. 3B, the MG-ECU 7 switches the frictional braking state 211 to the ON state, and, as illustrated in FIG. 3C, switches the regeneration limiting value to the unlimited value 223. From then onwards, the braking force demandable by the MG-ECU 7 is braking force up to the unlimited value 223, enabling braking force to be supplemented by the frictional braking force 231.

Thus, even in a state in which the frictional braking control is ON, the MG-ECU 7 does not immediately switch the regeneration limiting value. Thus, the MG-ECU 7 switches the frictional braking state 211 to the ON state, and switches the regeneration limiting value only when the driver has depressed the accelerator pedal, and the drive force demand 224 has moved to the + side (direction of travel). Thereby, by switching the regeneration limiting value in a state other than a state in which regenerative braking force is demanded (in a state when the accelerator pedal has been depressed and the drive force demand 224 has moved to the + side (direction of travel), the surprise, arising from braking force from the frictional braking component suddenly disappearing while frictional braking is being performed, can be prevented due to frictional braking being switched when in a not-in-use state.

Time t7 Onwards

At time t7, the regenerative braking state (equivalent to engine braking in a gasoline engine) is adopted due to the driver again lifting OFF the accelerator pedal. As illustrated in FIG. 3C, the drive force demand 221 is the limited value 222 or greater up till the time t8, and so supplementation by the frictional braking force 231 is not required.

When the drive force demand 221 falls below the limited value 222 at the time t8, the ESB-ECU 13 outputs the frictional braking force 231 corresponding to the difference between the drive force demand 221 and the limited value 222.

COMPARATIVE EXAMPLE

Figure 4:
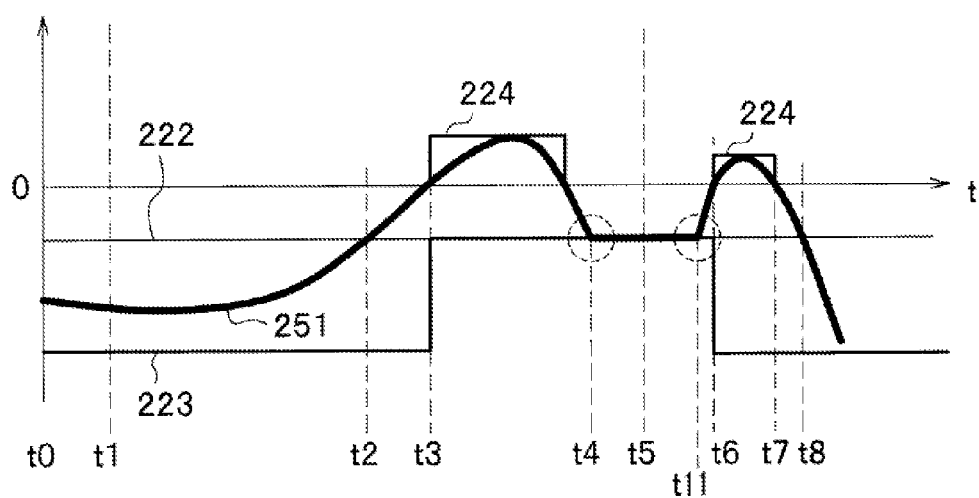
FIG. 4 is a graph illustrating changes with time in drive force demand and regeneration limiting value in a comparative example.

FIG. 4 is a graph illustrating change with time in the drive force demand and the regeneration limiting value in a comparative example.

FIG. 4 corresponds to FIG. 3C, and, other than at time t11, is similar to FIG. 3C, so explanation thereof will be omitted.

The reference numerals 222 to 224 are similar to those of FIG. 3C, and so explanation thereof will be omitted.

As illustrated in FIG. 4, drive force demand 251 in the comparative example changes abruptly at time t4 and time t11, as illustrated by the intermittent line circles. This results in a feeling of unease being imparted to the driver.

In the present embodiment, as illustrated in the interval from time t4 to time t6 in FIG. 3C, due to smoothing processing being performed on the drive force demand 221 even in the interval of output up to limited value 222, abrupt change in the drive force demand 221 is eliminated, enabling elimination of a feeling of unease from being imparted to the driver.

Configuration of MG-ECU 7 and ESB-ECU 13

Figure 5:
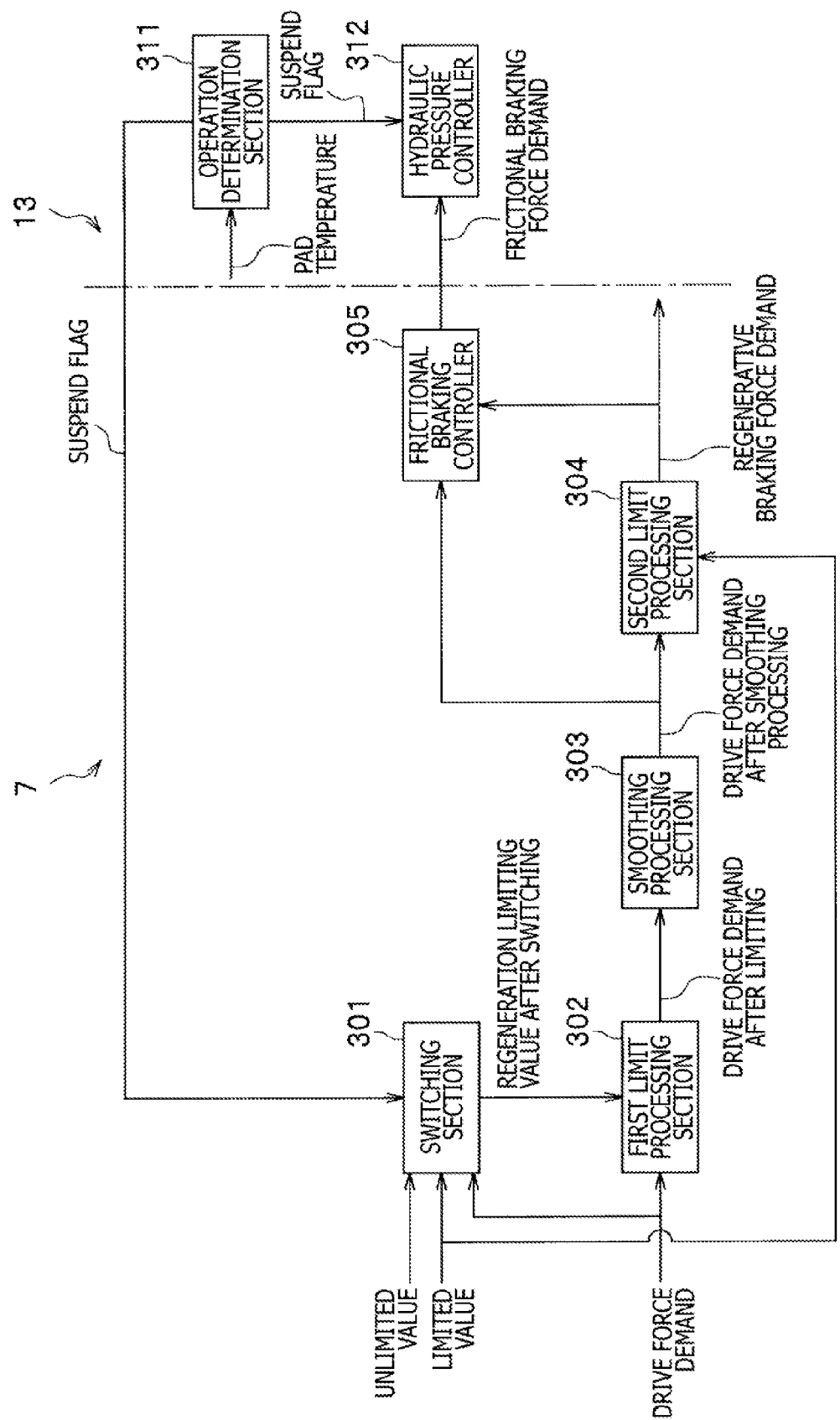
FIG. 5 is a block diagram illustrating a configuration of an MG-ECU and an ESB-ECU.

FIG. 5 is a block diagram illustrating a configuration of the MG-ECU and the ESB-ECU. The processing performed by each section illustrated in FIG. 5 will be explained later.

Configuration of MG-ECU 7

The MG-ECU 7 includes a switching section 301, a first limit processing section 302, a smoothing processing section 303, a second limit processing section 304, and a frictional braking controller 305.

The switching section 301 switches the regeneration limiting value to the limited value 222 (FIG. 3C) or to the unlimited value 223 (FIG. 3C) based on the suspend flag and the drive force demand sent from the ESB-ECU 13.

The first limit processing section 302 performs limit processing on the drive force demand at the current regeneration limiting value switched to by the switching section 301.

The smoothing processing section 303 performs smoothing processing on the output result of the first limit processing section 302 (the drive force demand after limiting) so as to achieve a smooth change in the drive force demand with time.

The second limit processing section 304 limits the output result of the smoothing processing section 303 (the drive force demand after smoothing processing) to the limited value 222. If the current regeneration limiting value (the regeneration limiting value after switching) is the limited value 222, then the output of the second limit processing section 304 is the same as the output of the smoothing processing section 303. If the current regeneration limiting value is the unlimited value 223, then the output of the second limit processing section 304 is the drive force demand limited to the unlimited value 223. The second limit processing section 304 outputs its own output result to the motor-generator 3, as a regenerative braking force demand, and also to the frictional braking controller 305.

The frictional braking controller 305 computes the difference between the output of the smoothing processing section 303, and the output of the second limit processing section 304, and outputs the computed difference value as a frictional braking force demand to the ESB-ECU 13. When this is performed, if the current regeneration limiting value (regeneration limiting value after switching) is the limited value 222, then, as described above, the output of the second limit processing section 304 and the output of the smoothing processing section 303 are the same value as each other, and so the frictional braking controller 305 outputs 0 as the frictional braking force demand. Namely, the MG-ECU 7 does not generate frictional braking force if the current regeneration limiting value is the limited value 222. If the current regeneration limiting value is the unlimited value 223, then the difference value between the output of the smoothing processing section 303 and the output of the limited value 222 is output as the frictional braking force demand.

Configuration of ESB-ECU 13

The ESB-ECU 13 includes an operation determination section 311 and a hydraulic pressure controller 312.

Based on the pad temperature input from the pad temperature sensor 12, the operation determination section 311 outputs a frictional braking control suspend flag, as ON or OFF, to the MG-ECU 7 and the hydraulic pressure controller 312.

The hydraulic pressure controller 312 controls the hydraulic pressure in each of the sections of the frictional braking device 10 and generates frictional braking force according to the frictional braking force demand output by the frictional braking controller 305 of the MG-ECU 7. The hydraulic pressure controller 312 performs processing to gradually release the hydraulic pressure of the frictional braking device 10 according to the ON or OFF state of the suspend flag output by the operation determination section 311.

Flowcharts

Operation of Operation Determination Section 311 of ESB-ECU 13

Figure 6:
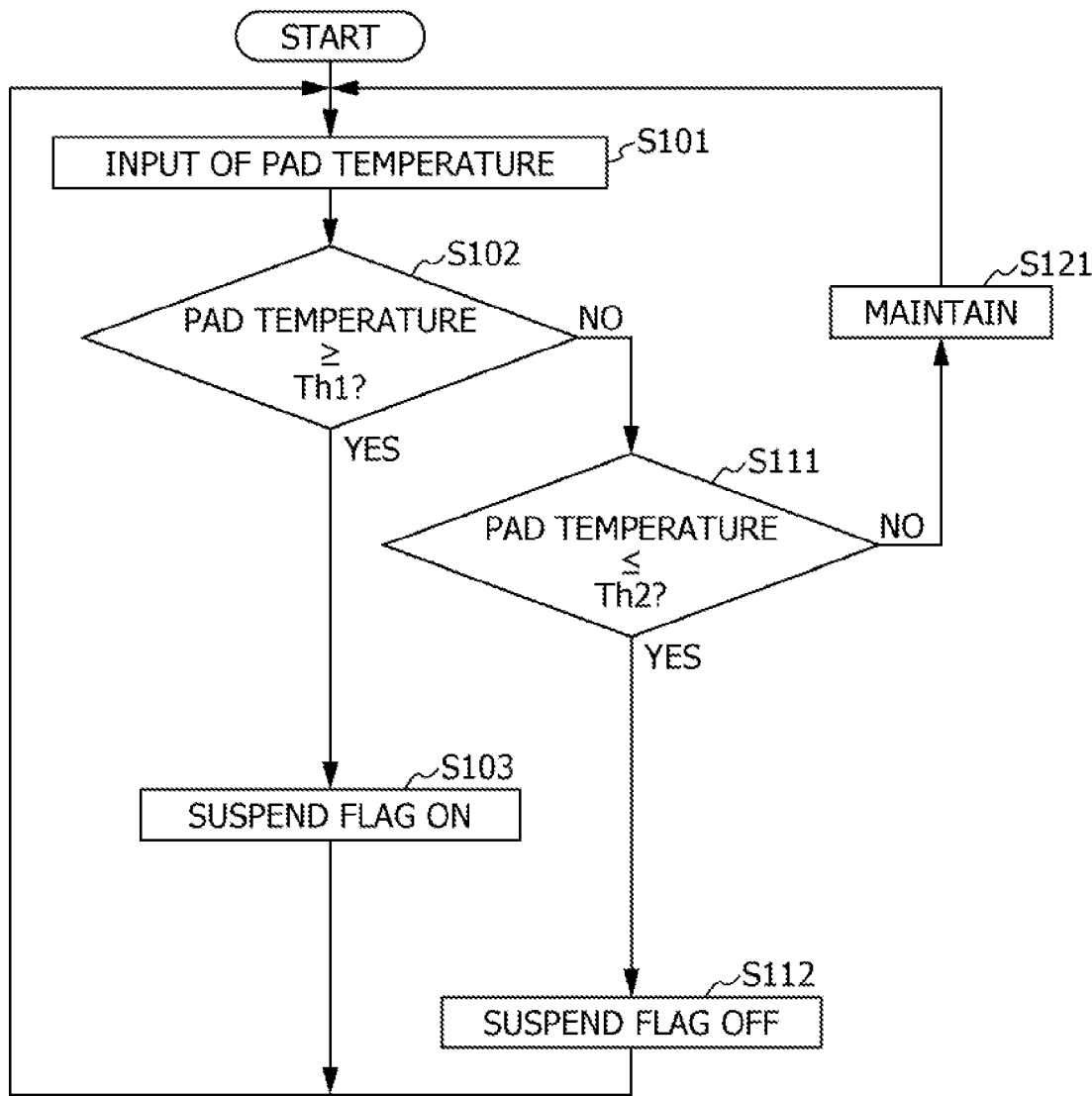
FIG. 6 is a flowchart illustrating an operational sequence in an operation determination section of an ESB-ECU.
Figure 7:
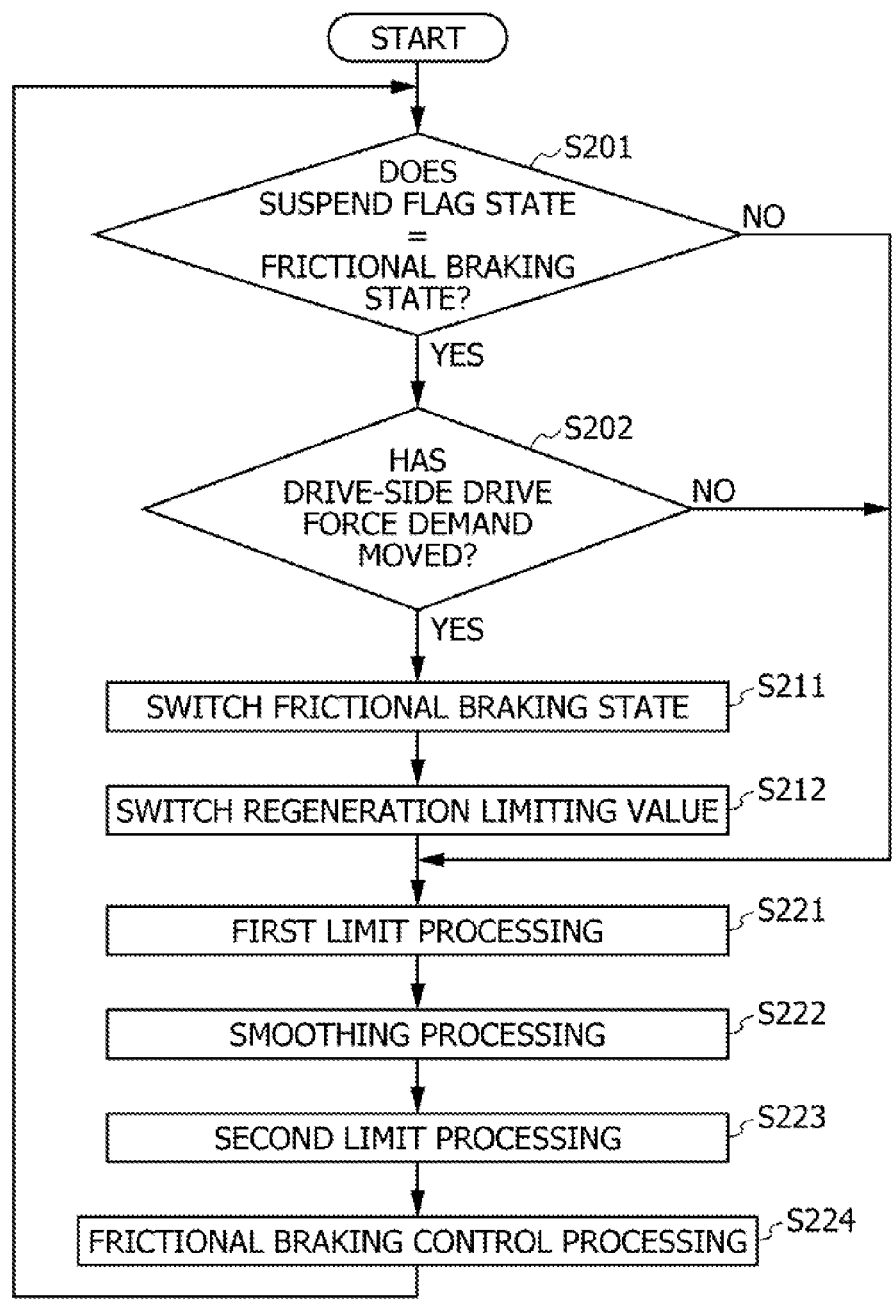
FIG. 7 is a flowchart illustrating an operational sequence in an MG-ECU according to the present embodiment.

FIG. 6 is a flowchart illustrating an operational sequence in an operation determination section of an ESB-ECU. Reference is also made to FIG. 3A and FIG. 5, as appropriate. In FIG. 6 to FIG. 8, whether or not the battery 5 is in a regeneration limited state is determined using the SOC detected based on the charged amount detection sensor 8 (see FIG. 1).

First, the operation determination section 311 receives input of the pad temperature 201 from the pad temperature sensor 12 (FIG. 1) (S101).

The operation determination section 311 determines whether or not the pad temperature is a threshold value Th1 to suspend frictional braking control, or greater (S102).

In cases in which the result of 102 is that the pad temperature is the threshold value Th1 or greater (S102, Yes), the operation determination section 311 sends the frictional braking control suspend flag as ON to the MG-ECU 7 (S103). The processing of step S103 corresponds to the time t1 in FIG. 3A. Note that the suspend flag is OFF in the initial state (when the ignition switch is switched ON).

In cases in which the result of 102 is that the pad temperature is less than the threshold value Th1 (S102, No), the operation determination section 311 determines whether or not the pad temperature is a threshold value Th2 to restart frictional braking control, or lower (S111).

In cases in which the result of S111 is that the pad temperature is less than the threshold value Th2 (S111, Yes), the operation determination section 311 sends the suspend flag as OFF to the MG-ECU 7 and the hydraulic pressure controller 312 (S112). The processing of step S103 corresponds to the time t5 of FIG. 3A.

In cases in which the result of step S111 is that the pad temperature is greater than the threshold value Th2 (S111, No), the operation determination section 311 maintains the current suspend flag state (S121).

Operation of MG-ECU 7

FIG. 7 is a flowchart illustrating an operational sequence in the MG-ECU according to the present embodiment. Reference is also made to FIGS. 3A to 3D and FIG. 5, as appropriate.

First, the switching section 301 determines whether or not the state of the suspend flag sent from the operation determination section 311 of the ESB-ECU 13 is the same as the frictional braking state (S201). For example, when, as in the interval from time t1 to time t3 in FIG. 3A and FIG. 3B the suspend flag 202 and the frictional braking state 211 are both ON, then the switching section 301 determines that the suspend flag state is the same as the frictional braking state. When, as in the interval from time t5 to time t6, the suspend flag 202 and the frictional braking state 211 are both OFF, then the switching section 301 determines that the suspend flag state is the same as the frictional braking state. When, as in the intervals from time t0 to t1, from time t3 to t5, and from time t6 onwards FIG. 3A and FIG. 3B, one out of the suspend flag 202 or the frictional braking state 211 is ON, and the other is OFF, then the switching section 301 determines that the suspend flag state is not the same as the frictional braking state.

In cases in which the result of step S201 is that the suspend flag state is not the same state as the frictional braking state (S201, No), the MG-ECU 7 proceeds to the processing of step S221. Namely, the MG-ECU 7 employs the current regeneration limiting value to compute and output the regenerative braking force and the frictional braking force.

In cases in which the result of step S201 is that the suspend flag state is the same state as the frictional braking state (S201, Yes), the switching section 301 determines whether or not the drive force demand on the drive (Dr) side has moved to the + side (S202). "Drive force demand on the drive (Dr) side moving to the + side" is what happens when the driver depresses the accelerator pedal (actuates acceleration).

In cases in which the result of step S202 is that the drive force demand on the drive side has moved to the + side (S202, Yes), the switching section 301 switches the frictional braking state (S211), and switches the regeneration limiting value (S212). This processing corresponds to time t3 and to time t6 in FIG. 3B and FIG. 3C.

After step S212, the MG-ECU 7 proceeds to the processing of step S221.

In cases in which the result, of step S202 is that the drive force demand on the drive side has not moved to the + side (S202, No), then the MG-ECU 7 proceeds to the processing of step S221.

At step S221, the first limit processing section 302 performs first limit processing of processing to limit the drive force demand using the current regeneration limiting value switched to by the switching section 301.

Next, the smoothing processing section 303 performs smoothing processing (S222) on the output result of the first limit processing section 302 such that the drive force demand changes smoothly with time.

Then, the second limit processing section 304 performs the second limit processing to limit the output result of the smoothing processing section 303 to the limited value 222 (S223). The second limit processing section 304 outputs its own output result to the motor-generator 3, as a regenerative braking force demand, and also to the frictional braking controller 305.

The frictional braking controller 305 then computes a difference between the output of the smoothing processing section 303 and the output of the second limit processing section 304, and outputs the computed difference value as the frictional braking force demand to the ESB-ECU 13 (S224). After step S224, the MG-ECU 7 returns to the processing of step S201.

Operation of Hydraulic Pressure Controller 312 of ESB-ECU 13

FIG. 8 is a flowchart illustrating an operational sequence in a hydraulic pressure controller of the ESB-ECU. Reference is also made to FIG. 3D and FIG. 5, as appropriate.

First, the hydraulic pressure controller 312 determines whether or not the frictional braking control suspend flag is currently in the ON state (S301).

In cases in which the result of step S301 is that the suspend flag is not currently in the ON state (S301, No), then the hydraulic pressure controller 312 performs hydraulic pressure control according to the frictional braking force demand sent from the MG-ECU 7 (S311). After step S311, the hydraulic pressure controller 312 returns to the processing of step S301.

In cases in which the result of step S301 is that the suspend flag is currently in the ON state (S301, Yes), the hydraulic pressure controller 312 then determines whether or not the frictional braking force currently being output is greater than zero (S302).

In cases in which the result of step S302 is that the frictional braking force currently being output is zero (S302, No), the hydraulic pressure controller 312 returns to the processing of step S301. Namely, the hydraulic pressure controller 312 maintains the frictional braking force at a state of zero.

In cases in which the result, of step S302 is that the frictional braking force currently being output is greater than zero (S302, Yes), then the hydraulic pressure controller 312 releases hydraulic pressure in the frictional braking device 10 (S303). Only a small amount of hydraulic pressure is released when this is performed. Thus, the frictional braking force is gradually reduced. After step S303, the hydraulic pressure controller 312 returns to the processing of step S301. The processing of step S303 corresponds to time t1 to time t2 in FIG. 3D.

According to the present exemplary embodiment, in cases in which the frictional braking force is being limited, braking force can be generated even when frictional braking is in a limited state by switching the regeneration limiting value from the limited value to the unlimited value, and by generating regenerative braking force of the amount of the limited value.

Moreover, due to switching the regeneration limiting value when the driver has actuated acceleration by depressing the accelerator pedal, surprise, arising from braking force from the frictional braking component suddenly disappearing while frictional braking is being performed, can be prevented due to frictional braking being switched when in a not-in-use state.

Moreover, according to the present embodiment, due to performing smoothing processing to smooth the value of the drive force demand limited to the limited value before output, abrupt change in the braking force arising when the braking force demand is limited to the first regeneration limit threshold value can be eliminated. This thereby enables the elimination of a feeling of unease being imparted to the driver, and enables an improvement in feel.

Explanation has been given of application to a case in the present embodiment where the temperature of the brake pads was a specific temperature or greater; however, application may also be made in cases in which there is insufficient frictional braking, such as due to a servo malfunction, or the like.

What is claimed is:

1. An electrically powered vehicle comprising:
a regenerative braking force generator that generates regenerative braking force in a vehicle to decelerate the vehicle;
a battery that stores electrical power regenerated with the regenerative braking force;
a frictional braking force generator that generates frictional braking force to decelerate the vehicle; and
a controller that controls the generation of the regenerative braking force and the generation of the frictional braking force, thereby controlling a total breaking force applied to the vehicle according to a deceleration force demand from a driver, wherein
the controller is configured,
to restrict the generation of the frictional braking force, and
to restrict the generation of the regenerative braking force according to a state of the battery, and
the controller is further configured,
to set a first regeneration limit threshold value to control the regenerative braking force to be the first regeneration limit threshold value or less when the controller restricts the generation of the regenerative braking force, and
to set a second regeneration limit threshold value to control the regenerative braking force to be the second regeneration limit threshold value or less when the controller does not restrict the generation of the regenerative braking force, the second regeneration limit threshold value being greater than the first regeneration limit threshold value, and
in a state in which the controller controls the regenerative braking force to be the first regeneration limit threshold value or less, but it does not restrict the generation of the frictional braking force, the controller causes the frictional braking force to be generated based on a difference between the first regeneration limit threshold value and the deceleration/acceleration force demand from the driver such that the total breaking force generated meets the deceleration/acceleration force demand, and
in cases in which the controller controls the regenerative braking force to be the first regeneration limit threshold value or less and restricts the generation of the frictional braking force, the regenerative braking force generator generates the regenerative braking force which is the first regeneration limit threshold value or less such that the regenerative braking force is restricted to be the first regeneration limit threshold value or less, but still generated when the frictional braking force is being restricted.

2. The electrically powered vehicle of claim 1, wherein the controller switches the threshold value from the first regeneration limit threshold value to the second regeneration limit threshold value when an acceleration force is demand from the driver.

3. The electrically powered vehicle of claim 1, wherein the first regeneration limit threshold value is determined based on regenerative braking force which the regenerative braking force generator is capable of outputting when the battery is in a regenerative braking state.

4. The electrically powered vehicle of claim 1, wherein the first regeneration limit threshold value is determined based on regenerative braking force which the regenerative braking force generator is capable of outputting when the battery is in a non-regenerative braking state.

5. The electrically powered vehicle of claim 1, wherein the controller smoothes and outputs regenerative braking generated based on the first regeneration limit threshold value.

6. The electrically powered vehicle of claim 1, wherein the controller gradually reduces the frictional braking force when restricting the generation of the frictional braking force.

* * * * *